(12) United States Patent
Van Mill et al.

(10) Patent No.: US 10,765,063 B2
(45) Date of Patent: *Sep. 8, 2020

(54) METHOD FOR CONTROLLING UNLOAD OF A MOBILE FARM IMPLEMENT

(71) Applicant: UNVERFERTH MANUFACTURING COMPANY, INC., Kalida, OH (US)

(72) Inventors: Michael D. Van Mill, Shell Rock, IA (US); Shawn W. Gerdeman, Delphos, OH (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/037,097

(22) Filed: Jul. 17, 2018

(65) Prior Publication Data

US 2018/0317386 A1    Nov. 8, 2018

Related U.S. Application Data

(63) Continuation of application No. 15/428,679, filed on Feb. 9, 2017, now Pat. No. 10,028,434, which is a continuation of application No. 14/942,500, filed on Nov. 16, 2015, now Pat. No. 9,596,805, which is a continuation of application No. 14/213,246, filed on Mar. 14, 2014, now Pat. No. 9,185,845.

(60) Provisional application No. 61/799,957, filed on Mar. 15, 2013.

(51) Int. Cl.
*A01D 41/127* (2006.01)
*A01D 90/10* (2006.01)
*G05B 19/409* (2006.01)
*G05B 19/416* (2006.01)

(52) U.S. Cl.
CPC .......... *A01D 41/127* (2013.01); *A01D 90/10* (2013.01); *G05B 19/409* (2013.01); *G05B 19/416* (2013.01); *G05B 2219/37095* (2013.01); *G05B 2219/45017* (2013.01)

(58) Field of Classification Search
CPC .... A01D 41/127; A01D 90/10; G05B 19/416; G05B 19/409; G05B 2219/45017; G05B 2219/37095

See application file for complete search history.

(56) References Cited

U.S. PATENT DOCUMENTS

| | | |
|---|---|---|
| 2,093,300 A | 9/1937 | Adams et al. |
| 2,271,434 A | 1/1942 | Johnhson |
| 2,867,336 A | 1/1959 | Soldini et al. |
| 2,896,771 A | 7/1959 | Mecham |
| 3,074,654 A | 1/1963 | Gugggemos |

(Continued)

OTHER PUBLICATIONS

Canadian Office Action, Application No. 2,570,512, dated Apr. 10, 2013, 3 pages.

(Continued)

*Primary Examiner* — Yuen Wong
(74) *Attorney, Agent, or Firm* — Rothwell, Figg, Ernst & Manbeck, P.C.

(57) ABSTRACT

A method of unloading mobile farm implements is presented. Unloading the mobile farm implement is accomplished by transmitting commands to unfold an auger arm and to open a container door and by monitoring weight measurements from the implement.

5 Claims, 8 Drawing Sheets

(56) References Cited

U.S. PATENT DOCUMENTS

| | | |
|---|---|---|
| 3,090,515 A | 5/1963 | Crowther |
| 3,493,136 A | 2/1970 | Spellman, Jr. |
| 3,498,483 A | 3/1970 | Meharry |
| 3,572,643 A | 3/1971 | Birdsall |
| 3,677,540 A | 7/1972 | Weiss |
| 3,782,528 A | 1/1974 | Burger et al. |
| 3,835,868 A | 9/1974 | Heck |
| 3,837,415 A | 9/1974 | Connors et al. |
| 3,913,850 A | 10/1975 | Daniel |
| 3,968,771 A | 7/1976 | Walgenbach et al. |
| 4,037,745 A | 7/1977 | Hengen et al. |
| 4,044,920 A | 8/1977 | Swartzendruber |
| 4,222,498 A | 9/1980 | Brock |
| 4,236,240 A | 11/1980 | Yoshida |
| 4,345,628 A | 8/1982 | Campbell |
| 4,411,581 A | 10/1983 | Niewold |
| 4,465,211 A | 8/1984 | van der Lely et al. |
| 4,503,803 A | 3/1985 | Barnes |
| 4,522,275 A | 6/1985 | Anderson |
| 4,619,531 A | 10/1986 | Dunstan |
| 4,742,938 A | 5/1988 | Niewold |
| 4,911,256 A | 3/1990 | Attikiouzel |
| 5,016,197 A | 5/1991 | Neumann et al. |
| 5,186,396 A | 2/1993 | Wise et al. |
| 5,285,020 A | 2/1994 | Jurca |
| 5,299,313 A | 3/1994 | Petersen et al. |
| 5,354,526 A | 10/1994 | Jose et al. |
| 5,423,455 A | 6/1995 | Ricciardi et al. |
| 5,424,957 A | 6/1995 | Kerkhoff et al. |
| 5,468,113 A | 11/1995 | Davis |
| 5,484,249 A | 1/1996 | Klatt |
| 5,520,495 A | 5/1996 | Sukup |
| 5,529,455 A | 6/1996 | Kaster et al. |
| 5,718,556 A | 2/1998 | Forsyth |
| 5,764,522 A | 6/1998 | Shalev |
| 5,785,481 A | 7/1998 | Ockels |
| 5,800,116 A | 9/1998 | Smith et al. |
| 5,835,868 A | 11/1998 | McElroy et al. |
| 5,853,244 A | 12/1998 | Hoff et al. |
| 5,880,407 A | 3/1999 | Flammang |
| 5,888,044 A | 3/1999 | Baskerville |
| 6,042,326 A | 3/2000 | Thomas et al. |
| 6,066,809 A | 5/2000 | Campbell et al. |
| 6,120,233 A | 9/2000 | Adam |
| 6,209,880 B1 | 4/2001 | Turnwald |
| 6,325,588 B1 | 12/2001 | Nolin |
| 6,354,465 B2 | 3/2002 | Bell et al. |
| 6,384,349 B1 | 5/2002 | Voll |
| 6,405,855 B1 | 6/2002 | Peltier et al. |
| 6,604,620 B2 | 8/2003 | Dennis |
| 6,621,014 B1 | 9/2003 | Tanner et al. |
| 6,767,174 B2 | 7/2004 | Cresswell |
| 6,814,532 B1 | 11/2004 | Thompson et al. |
| 6,964,551 B1 | 11/2005 | Friesen |
| 6,971,324 B1 | 12/2005 | Beck |
| 7,017,624 B2 | 3/2006 | Reinsch et al. |
| 7,055,559 B2 | 6/2006 | Reinsch et al. |
| 7,104,425 B2 | 9/2006 | Le Roy |
| 7,393,275 B2 | 7/2008 | Voss et al. |
| 7,428,042 B2 | 9/2008 | Ghiraldi |
| 7,454,304 B2 | 11/2008 | Johansen et al. |
| 7,488,149 B2 | 2/2009 | Waldner |
| 7,500,817 B2 | 3/2009 | Furrer et al. |
| 7,507,917 B2 | 3/2009 | Keitenheuser |
| 7,629,542 B1 | 12/2009 | Harding et al. |
| 7,633,021 B2 | 12/2009 | Pfohl et al. |
| 7,735,365 B2 | 6/2010 | Crain et al. |
| 7,858,888 B2 | 12/2010 | Lucas et al. |
| 7,874,899 B2 | 1/2011 | Mackin |
| 8,097,820 B2 | 1/2012 | Klubertanz |
| 2001/0038018 A1 | 11/2001 | Bell et al. |
| 2003/0042273 A1 | 3/2003 | House |
| 2003/0057055 A1 | 3/2003 | Haukaas et al. |
| 2006/0114743 A1 | 6/2006 | Galijan |
| 2006/0180062 A1 | 8/2006 | Furrer et al. |
| 2008/0127711 A1 | 6/2008 | Farag |
| 2009/0020076 A1 | 1/2009 | Ghiraldi |
| 2009/0099775 A1 | 4/2009 | Mott et al. |
| 2009/0205877 A1 | 8/2009 | Claypool |
| 2010/0009731 A1 | 1/2010 | Coers et al. |
| 2010/0193255 A1 | 8/2010 | Stevens et al. |
| 2010/0274452 A1 | 10/2010 | Ringwald et al. |
| 2010/0314221 A1 | 12/2010 | Garberson et al. |
| 2011/0220677 A1 | 9/2011 | Bertolani |
| 2012/0085458 A1 | 4/2012 | Wenzel |
| 2012/0099948 A1* | 4/2012 | Bump .............. G01G 13/16 414/21 |
| 2013/0045067 A1 | 2/2013 | Pickett et al. |
| 2013/0103249 A1 | 4/2013 | Pieper et al. |

OTHER PUBLICATIONS

Model 2300 Air System and the Model 4800 Air Drill, both made and sold by Concord, as illustrated in the Concord brochure, 12 pages.

Amendment filed in U.S. Appl. No. 12/862,052 dated Mar. 28, 2013, 16 pages.

Digi-Star EZ 400 Operators Manual, Mar. 4, 2008, 22 pages.

Dinomica Generale, Grain Scale, web page, Feb. 1, 2011, 2 pages.

* cited by examiner

METHOD FOR CONTROLLING UNLOAD OF A MOBILE FARM IMPLEMENT

CROSS-REFERENCE TO RELATED APPLICATION

This application is a continuation application of U.S. Ser. No. 15/428,679, filed Feb. 9, 2017, which is a continuation application of U.S. Ser. No. 14/942,500, filed Nov. 16, 2015, now U.S. Pat. No. 9,596,805, which is a continuation application of U.S. Ser. No. 14/213,246, filed Mar. 14, 2014, now U.S. Pat. No. 9,185,845, which claims the benefit of U.S. Provisional Application Ser. No. 61/799,957, filed on Mar. 15, 2013, the entire disclosures of which are incorporated by reference herein in their entirety.

BACKGROUND OF THE INVENTION

Field of the Invention

The present invention relates generally to a handheld control device for interacting with a mobile farm implement and, more particularly, to a handheld control device that is configured to communicate commands or sensor information with the mobile farm implement.

Description of the Related Art

To control and monitor mobile farm implements such as grain carts and tractors, various sensors and controllers have been placed in the mobile farm implements to collect data or carry out commands. On some mobile farm implements, the sensors and controllers have been wired to connect to display terminals mounted in the mobile farm implements. The display terminal on a particular mobile farm implement may display data collected from the sensors on that implement or commands that may be issued to the controllers on that implement. To facilitate communication between display terminals and electronic hardware on mobile farm implements, some manufacturers of mobile farm implements and some manufacturers of display terminals have adopted the same communication protocol in their devices. These mobile farm implements may use the communication protocol to share information about its functionality with terminals that use the same protocol.

SUMMARY OF THE INVENTION

A handheld control device, method, and non-transitory computer-readable medium for interacting with mobile farm implements is presented.

According to one aspect of the application, the system, method, and computer-readable medium automates unloading of mobile farm implements. In an embodiment, the handheld control device receives, from a user interface of the handheld control device, a first command to assist unloading of agricultural material from a mobile farm implement. It determines whether a speed of the mobile farm implement is at or below a first threshold. In response to a determination that the speed of the mobile farm implement is at or below the first threshold, a second command to the mobile farm implement to unfold an auger arm of the mobile farm implement may be transmitted. In an embodiment, a determination may be made as to whether weight measurements from the mobile farm implement have reached a steady value and whether a power takeoff speed is at or above a second threshold. In response to a determination that both such conditions are satisfied, a third command to the mobile farm implement to open a container door may be transmitted to the mobile farm implement. In an embodiment, a determination may be made as to whether a subsequent weight measurement from the mobile farm implement is at or below a third threshold. In response to a determination that the condition is satisfied, a fourth command may be transmitted to the mobile farm implement to close the container door and a fifth command to the mobile farm implement to fold the auger arm.

In an embodiment, the handheld control device, method, and computer-readable medium may interface with multiple mobile farm implements using multiple communication protocols. In an embodiment, the handheld control device may detect presence of a first mobile farm implement. A determination may be made that the first mobile farm implement uses a first communication protocol. The handheld control device may further determine whether a description of the first communication protocol is stored on the handheld control device. It may communicate, using the first communication protocol, a first command or sensor information with the first mobile farm implement in response to a determination that the description of the first communication protocol is stored on the handheld control device. In an embodiment, presence of a second mobile farm implement may be detected by the handheld control device. A determination may be made that second mobile farm implement is using a second communication protocol, where the first communication protocol is different than the second communication protocol. The handheld control device may determine whether a description of the second communication protocol is stored on the handheld control device. It may communicate, using the second communication protocol, a second command or sensor information with the second mobile farm implement in response to a determination that the description of the second communication protocol is stored on the handheld control device.

In an embodiment, the handheld control device, method, and computer-readable medium may wirelessly collect sensor data from mobile farm implements.

DETAILED DESCRIPTION OF THE PRESENT INVENTION

While the present invention may be embodied in many different forms, a number of illustrative embodiments are described herein with the understanding that the present disclosure is to be considered as providing examples and not intended to limit the invention to the preferred embodiments described and/or illustrated herein.

FIGS. 1-4 illustrate an environment in which a handheld control device 100 interacts with mobile farm implements, such as a grain cart 300 or a tractor 200 towing the grain cart, according to an embodiment of the present invention. According to one aspect of the invention, the system provides a handheld control device that may automate at least part of an unloading of agricultural material from a mobile farm implement. The automation may include issuing commands to the mobile farm implement in a desired order and may include automatically monitoring unloading conditions. According to another aspect of the invention, the system provides a handheld control device that is able to communicate with multiple mobile farm implements using different communication protocols. For example, the control device may communicate with one mobile farm implement using an ISO 11783 (i.e., Isobus) protocol and may communicate with another mobile farm implement using an ISO 11898 (i.e., CANbus) protocol. According to yet another aspect of the invention, the system provides a handheld control device that may wirelessly collect sensor data from a mobile farm implement while the control device is located outside the mobile farm implement. For example, a driver in a harvester may wirelessly collect sensor data from a grain cart that is being loaded by the harvester.

Figure 1:
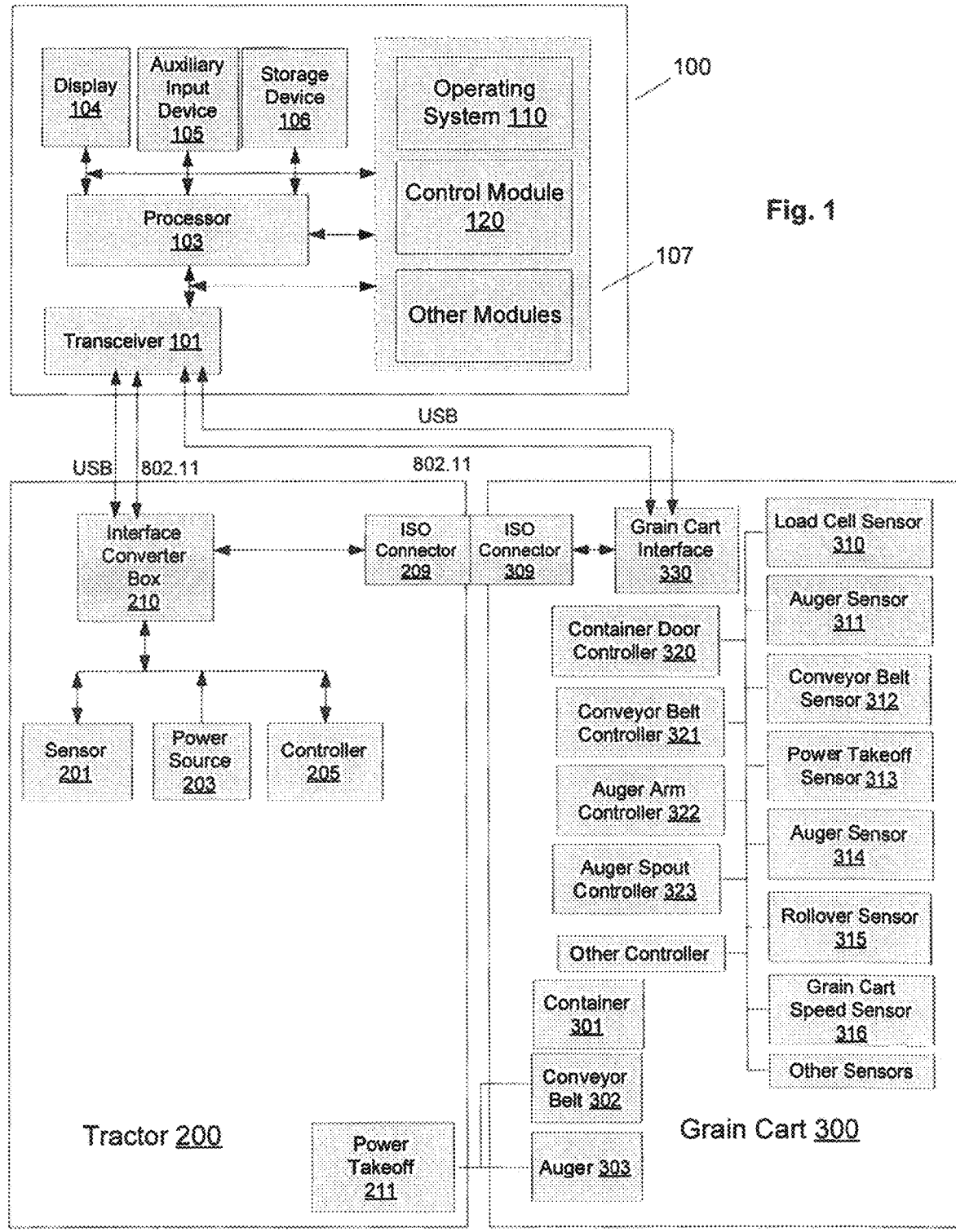
FIG. 1 illustrates a schematic view of a system having mobile farm implements and a control device for interfacing with the mobile farm implements, according to an embodiment of the present invention.

In the embodiment illustrated in FIG. 1, a handheld control device 100 may communicate directly with the grain cart 300, or may do so through another mobile farm implement, such as the tractor 200. For example, the handheld control device 100 and the grain cart 300 may communicate directly via a USB or IEEE 802.11 (Wi-FI™) or other interface, or the grain cart 300 may have no USB or IEEE 802.11 capability and rely on the tractor 200 to provide such capabilities to communicate with the control device 100.

The handheld control device 100 may be a mobile phone (e.g., iPhone®), a tablet computer (e.g., iPad®), or any other handheld control device. The handheld control device 100 may include a transceiver 101 for communicating with a mobile farm implement, a display 104 and auxiliary input device 105 (e.g., a keyboard) for communicating with a user of the control device 100; a processor 103 and memory 107 for executing modules that implement various functionality of the control device; and a storage device 106 for storing data, instructions, and other information. In an embodiment, the modules may include an operating system 110 (e.g., iOS®) that provides a platform on which another module, such as control module 120, executes. For example, the operating system 110 may allow the control module 120 to be downloaded as an application and to execute on the handheld control device 100. In an embodiment, the memory 107 may provide temporary storage for the modules while they are being executed, while the storage device 106 may provide long-term, non-volatile storage for the modules. The components of the handheld control device 100 may be located inside a housing of the device 100, or may be externally attached to the housing of device 100.

Mobile farm implements such as the tractor 200 and the grain cart 300 may interact with the handheld control device 100 by, for instance, sending sensor information to the handheld control device 100 or executing commands received from the device 100. For example, in the embodiment illustrated in FIG. 1, the grain cart 300 may provide information about a container 301, a conveyor belt 302, or an auger 303, and may execute commands related to these components.

For the container 301, a load cell sensor 310 may measure a weight or volume of agricultural material held by the container 301, while a container door controller 320 may be configured to open or close a door of the container 301.

For the conveyor belt 302, a conveyor belt sensor 312 may measure a belt speed of the conveyor belt 302, while a conveyor belt controller 321 may control the belt speed, tension, or any other property of the conveyor belt 302.

For the auger 303, an auger sensor 314 may measure a position or rotational speed of the auger 303, while an auger arm controller 322 or an auger spout controller 323 may control movement of the auger arm or auger spout, respectively. If either the conveyor belt 302 or the auger 303 is actuated by another power source such as a power takeoff, then a power takeoff sensor 313 may measure the rotational speed of the power takeoff (e.g., the PTO RPM).

For the grain cart itself, a rollover sensor 315 may detect a weight distribution across the grain cart 300 or any other indication of an uneven load that may tip over the grain cart 300. A grain cart speed sensor 316 may measure a speed of the grain cart 300. Control of the mobile farm implements, including farm implements with a bin or container to load material, is discussed in more detail in co-owned and co-pending application entitled "Weight-Based Chute Control for a Farm Implement," application Ser. No. 14/213,095, filed on even date herewith (Mar. 15, 2013), the entire content of which is incorporated herein by reference.

The tractor 200 may, in an embodiment, likewise have a sensor 201 for measuring a property of the tractor 200, such as speed of a power takeoff 211 used to provide actuation power to the grain cart 300. In an embodiment, it may have a controller 205 for controlling a component (e.g., steering component, transmission component, etc.) on the tractor.

In an embodiment, the transceiver 101 of the control device 100, interface converter box 210 of the tractor 200, and grain cart interface 330 of the grain cart 300 may facilitate communication in the system illustrated in FIG. 1. The interface converter box 210 on the tractor 200 may provide a USB, 802.11, or any other communication interface for communicating with the transceiver 101 on the control device 100. The interface converter box 210 and the grain cart interface 330 may each provide an interface, such as an ISO (e.g., ISO 11783) interface for communicating with each other. The communication may be physically conducted through ISO connector 209 on the tractor 200 and ISO connector 309 on the grain cart 300.

In an embodiment, the interface converter box 210 may provide electrical power from a power source 203 (e.g., battery) on the tractor 200 to the handheld control device 100 or the grain cart 300. The electrical power may be used to, for example, recharge any batteries on the handheld control device 100 or power sensors and controllers on the grain cart 300.

Figure 2:
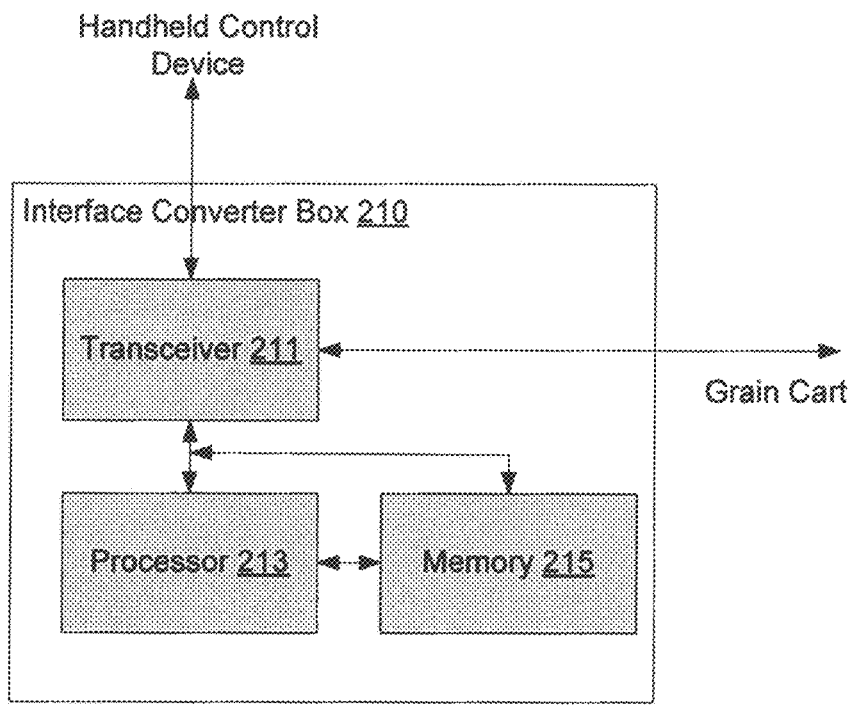
FIG. 2 illustrates a schematic view of an interface converter box on a tractor for interfacing with a control device or with other mobile farm implements, according to an embodiment of the present invention.
Figure 3:
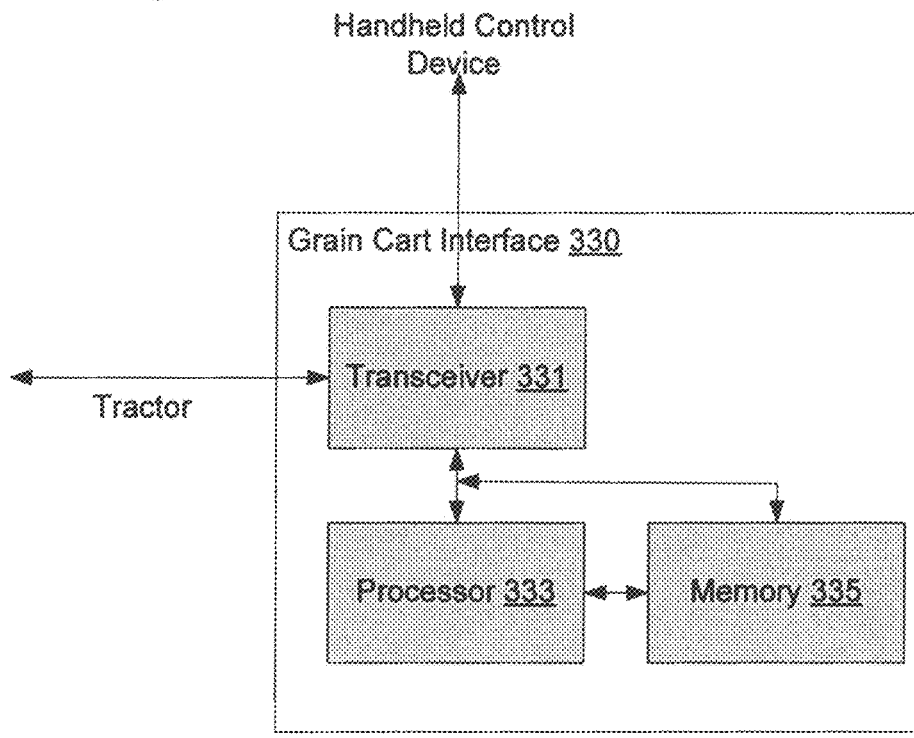
FIG. 3 illustrates a schematic view of an interface on a grain cart for interfacing with a control device or with other mobile farm implements, according to an embodiment of the present invention.

FIGS. 2-3 illustrate various components of the interface converter box 210 and grain cart interface 330. In an embodiment, the interface converter box 210 may relay a signal (e.g., data or command) between the handheld control device 100 and the grain cart 300 without modifying the signal. In an embodiment, the interface converter box 210 may receive a signal from the handheld control device 100 and convert the signal to a format that will be recognized by the grain cart 300. Similarly, the interface converter box 210 may receive a signal from the grain cart 300 and convert the signal to a format that will be recognized by the handheld control device 100. In an embodiment, the conversion may be unnecessary because the control device 100 itself may perform the formatting based on descriptions of different communication protocols used by mobile farm implements.

In an embodiment, the interface converter box 210 may include a transceiver 211 configured to communicate with the handheld control device 100 and the grain cart 300, and may include a processor 213 and memory 215 configured to generate signals having the format that will be recognized by the device 100 or cart 300. Format information for a mobile farm implement may be based on a communication protocol being used by the mobile farm implement. The formatting may be performed by the interface converter box 210 on the tractor 200, or may be performed by the handheld control device 100.

In an embodiment, the memory 215 may cache information passing between the control device 100 and the grain cart 300. In an embodiment, the memory may act as a buffer that stores information intended for the device 100 or the cart 300, and send the information at a later time.

The grain cart interface 330 may, according to an embodiment, include a transceiver 331 configured to communicate with the handheld control device 100 or the tractor 200. It may have a memory 335 configured to store information from the control device 100, information generated by sensors on the grain cart 300, or any other information. A processor 333 may be included to control communication or any other function on the grain cart 300. In some instances, the processor 333 may replace one or more of the controllers illustrated in FIG. 1.

Figure 4:
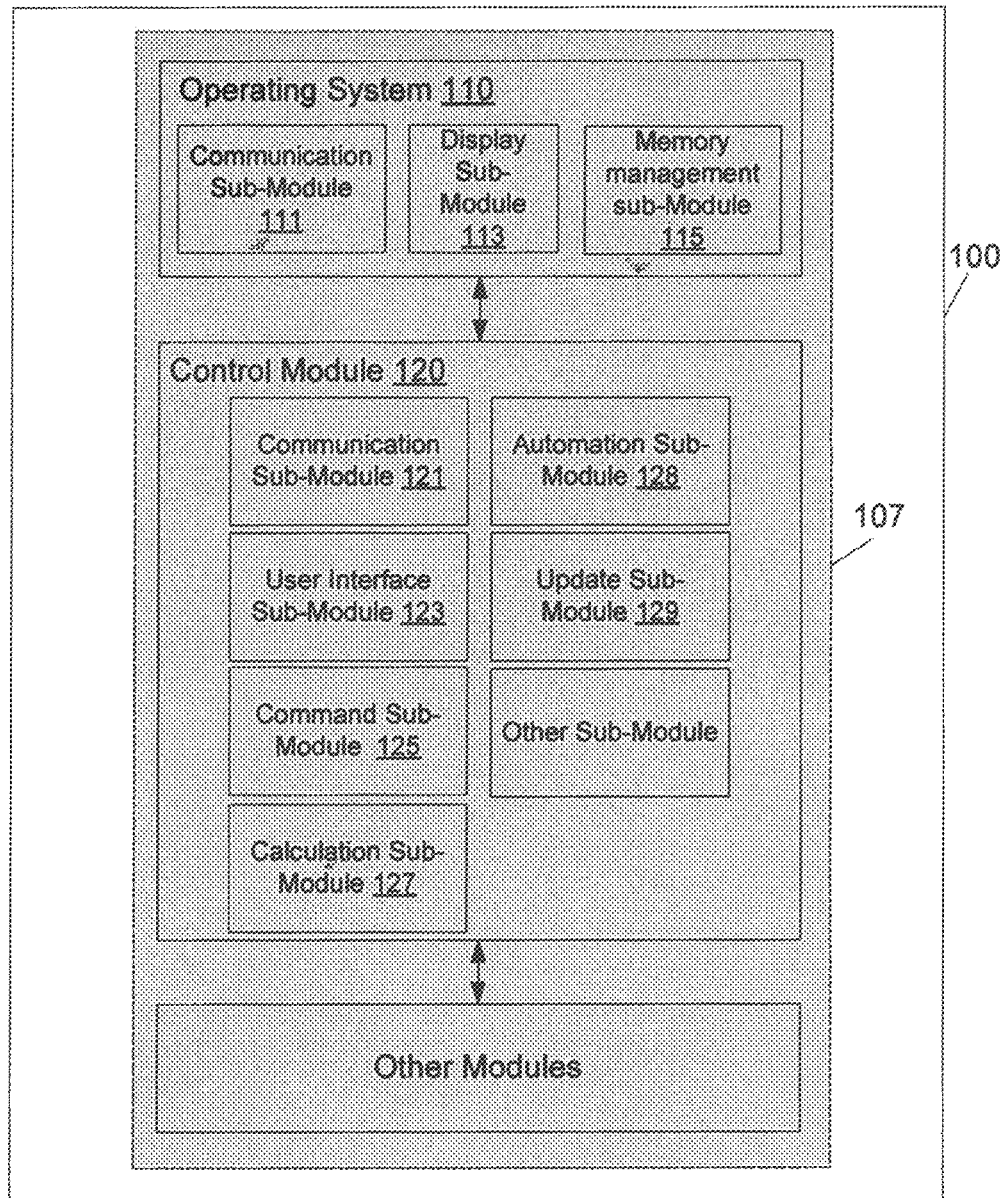
FIG. 4 illustrates a schematic view of various modules being executed on a control device, according to an embodiment of the present invention.

FIG. 4 illustrates various sub-modules of the operating system 110 and control module 120 of the handheld control device 100. As discussed above, the operating system 110 may provide a platform on which other modules, including control module 120, operate. The platform may include a software management system that is configured to download control module 120 as a mobile app or any other software application and to retrieve any updates of the control module 120. Each module may include computer-readable instructions that are loaded in the memory 107 and executed by the processor 103.

In an embodiment, the operating system 110 may include sub-modules for managing components of the handheld control device 100, such as memory, user input, communication, and display. For example, the sub-modules of the operating system 110 may include a communication sub-module 111 configured to manage the transceiver 101, the auxiliary input device 105, or any other communication interface on the control device 100. The sub-modules may further include a display sub-module 113 configured to manage the display 104, and may include a memory management sub-module 115 configured to manage the storage device 106 and the memory 107.

In an embodiment, the control module 120 may include various sub-modules that implement functionalities of the module. For example, a communication sub-module 121 may allow the handheld control device 100 to communicate with the tractor 200 or grain cart 300. The sub-module 121 may rely on the communication sub-module 111 of the operating system to access the transceiver 101 and transmit or receive information. When communicating with the grain cart 300, the sub-module 121 may be configured to place the communication in a format that will be recognized by the grain cart 300, or may rely on another device to do so.

The user interface sub-module 123 may allow the control device 100 to generate menus, forms, or any other user interface. The user interface may display information to users and collect information from them. The sub-module 123 may rely on communication sub-module 111 of the operating system 110 to retrieve information from a user input device (e.g., the keyboard), and may rely on display sub-module 113 of the operating system 110 to display information.

The command sub-module 125 may allow the control device 100 to determine what commands are available for a particular type of mobile farm implement. The sub-module 125 may be configured to generate a command to be outputted to the mobile farm implement. The generated command may be in a format that the mobile farm implement will recognize, or may be converted to an appropriate format by another device.

The calculation sub-module 127 may allow the control device 100 to determine when the tractor 200 or grain cart 300 satisfies or deviates from a particular condition, such as a threshold related to load cell weight, power takeoff, weight distribution, or any other condition. The condition may affect, for example, when a command may begin to execute or when an alarm on the mobile farm implement needs to be activated.

The automation sub-module 128 may be configured to generate a sequence of commands corresponding to a desired action for a mobile farm implement, such as an unloading action on the grain cart 300. The sub-module 128 thus provides a greater degree of automation and frees a user from having to manually invoke each step of the desired action.

The update sub-module 129 may be configured to receive an update to the control module 120, including an update to computer-readable instructions of the module or to information used by the computer-readable instructions.

Figure 5A:
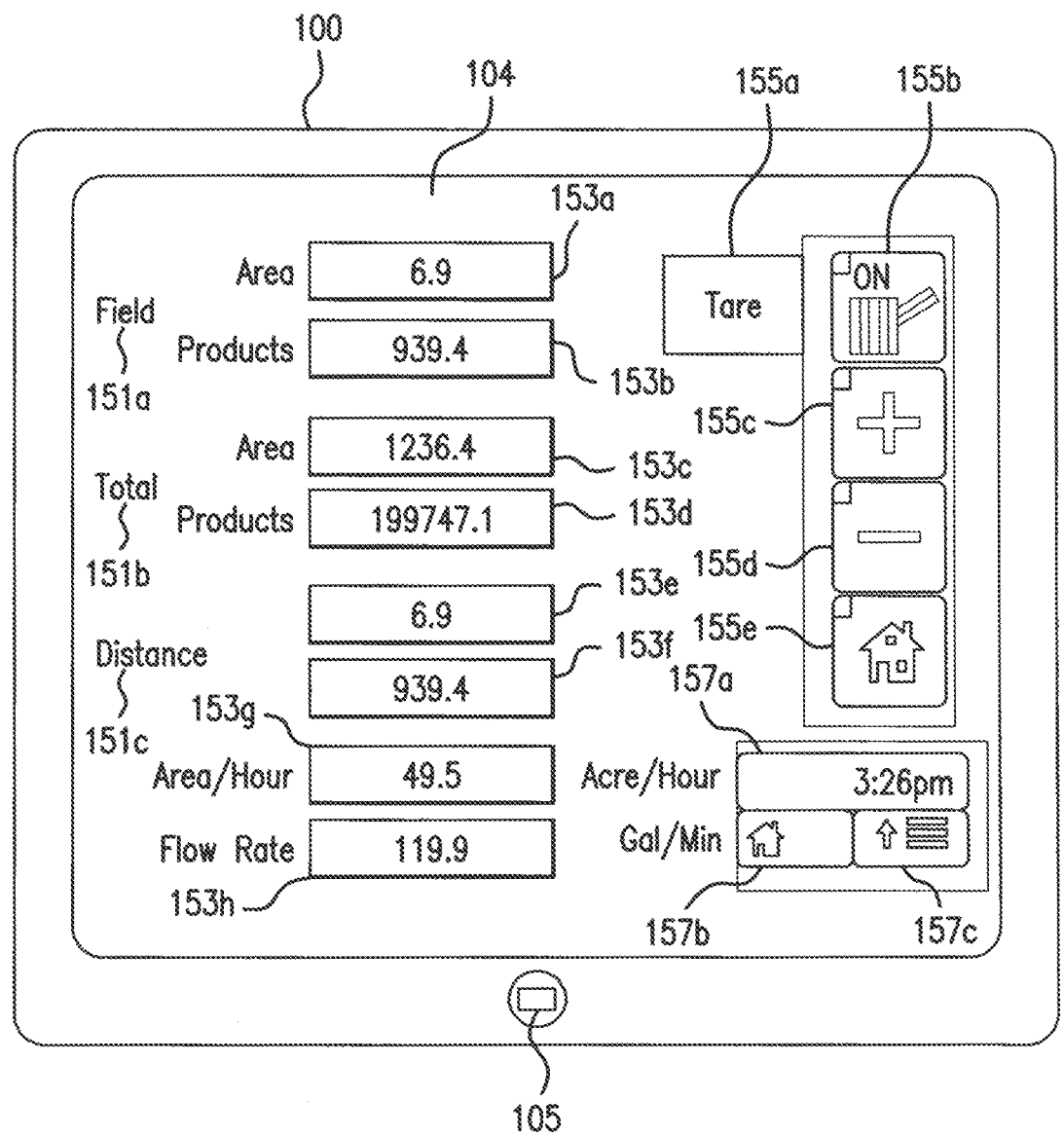
FIGS. 5A and 5B illustrate example views of a user interface on a control device, according to an embodiment of the present invention.
Figure 5B:
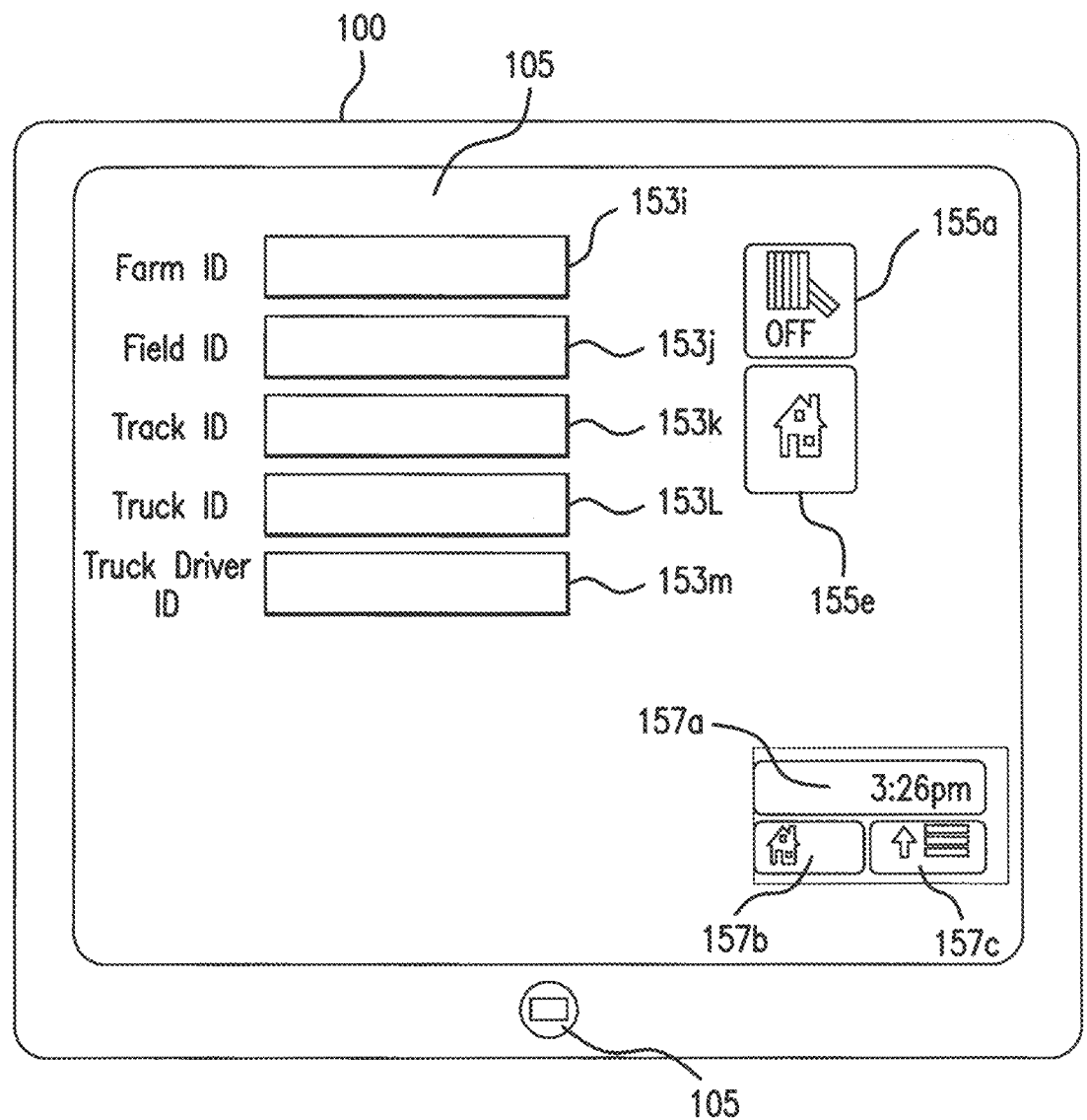

FIGS. 5A-5B illustrate example user interfaces generated by the control module 120 (e.g., by its user interface sub-module 123) and displayed on the display 104 of the control device 100. The user interface may allow a user to monitor operation of a mobile farm implement, provide user input for the operation, or invoke a command on the mobile farm implement. The user interface may display labels, text boxes, command buttons, status bars, or any other user interface. For example, the user interface illustrated in FIG. 5A includes a menu that presents information about loading of the grain cart 300, available commands associated with the loading, and various other information.

Labels 151a-151c in FIG. 5A are generated on the user interface to identify what type or category of information is being presented. The information may include, for instance, an area that the grain cart 300 has covered and an amount of material that has been loaded onto the grain cart 300. Label 151a, named "Field," may be displayed next to a value that shows the covered area and amount of loaded material for a particular field, while label 151b, named "Total," may be displayed next to a value that shows the total covered area and total amount of loaded material. Label 151c, named "Distance," may be displayed next to a value that shows a distance that the grain cart 300 has traveled in the particular field and next to another value that shows a total distance that the grain cart 300 has traveled.

Values of various parameters in FIG. 5A may be displayed in output fields, such as text boxes 153*a*-153*h*. The text boxes 153*a*-153*f* may display the areas and amounts described above, while text box 153*g* and 153*h* may display calculated values, such as how much area is being covered by the grain cart 300 every hour or how much products is being loaded into the grain cart 300 every minute.

In an embodiment, the user interface may present command buttons and icons on the user interface. A command button may trigger an action on the mobile farm implement, while an icon may be a status icon that conveys a status of the mobile farm implement or of the handheld control device 100. The command buttons may be virtual buttons presented on a touch screen, thus reducing the number of physical buttons needed by the handheld control device 100. Example command buttons are illustrated in FIG. 5A. Command button 155*a* allows a user to tare a weight measurement prior to loading or unloading. Command button 155*b* may trigger a loading or unloading sequence on the grain cart 300. Command buttons 155*c* and 155*d* may adjust various quantities, such as a threshold corresponding to the loading or unloading sequence. Command button 155*e* may allow a user to return to a home menu.

In an embodiment, status icons 157*a*-157*c* may indicate a time, a status of the application, such as of control module 120, or any other status.

FIG. 5B illustrates another user interface that is different from the user interface displayed in FIG. 5A. Different functions may use different menus or other user interfaces. For example, the menu illustrated in FIG. 5A may be used to output information to a user, while the menu illustrated in FIG. 5B may be used to collect information from the user. The information may be collected through text boxes, radio buttons, drop-down menus, any other form element, or any other input element. For example, FIG. 5B illustrates input text boxes 153*i*-153*m* for collecting a farm ID, field ID, track ID, truck ID, and truck driver ID, respectively, from a user. In an embodiment, the handheld control device 100 may be configured to auto-fill a user input element if it can retrieve or determine the value corresponding to that element. For example, farm ID may be determined based on GPS capability of the control device 100, while truck driver ID may be determined from a user profile stored on the control device 100.

In an embodiment, the interface illustrated in FIG. 5B may also present command buttons, such as command button 155*a* and 155*e*. As shown in the figure, command button 155*a* may be a toggle button that is switched between an on and off state, and its graphics may change corresponding to whether the command is in an on or off state.

Figure 6:
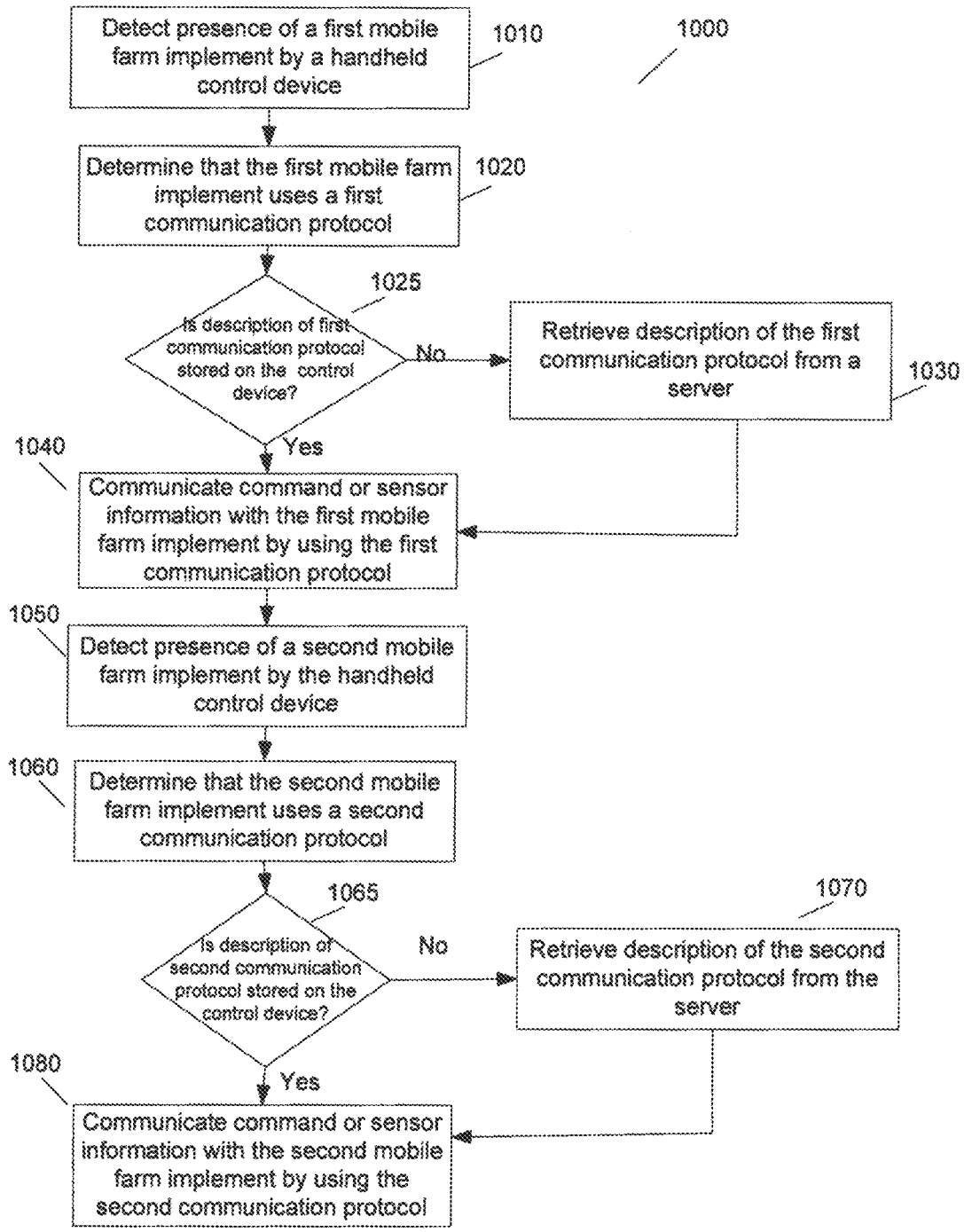
FIG. 6 illustrates a flow chart showing example operations of a method for communicating with different mobile farm implements that use different communication protocols.
Figure 7:
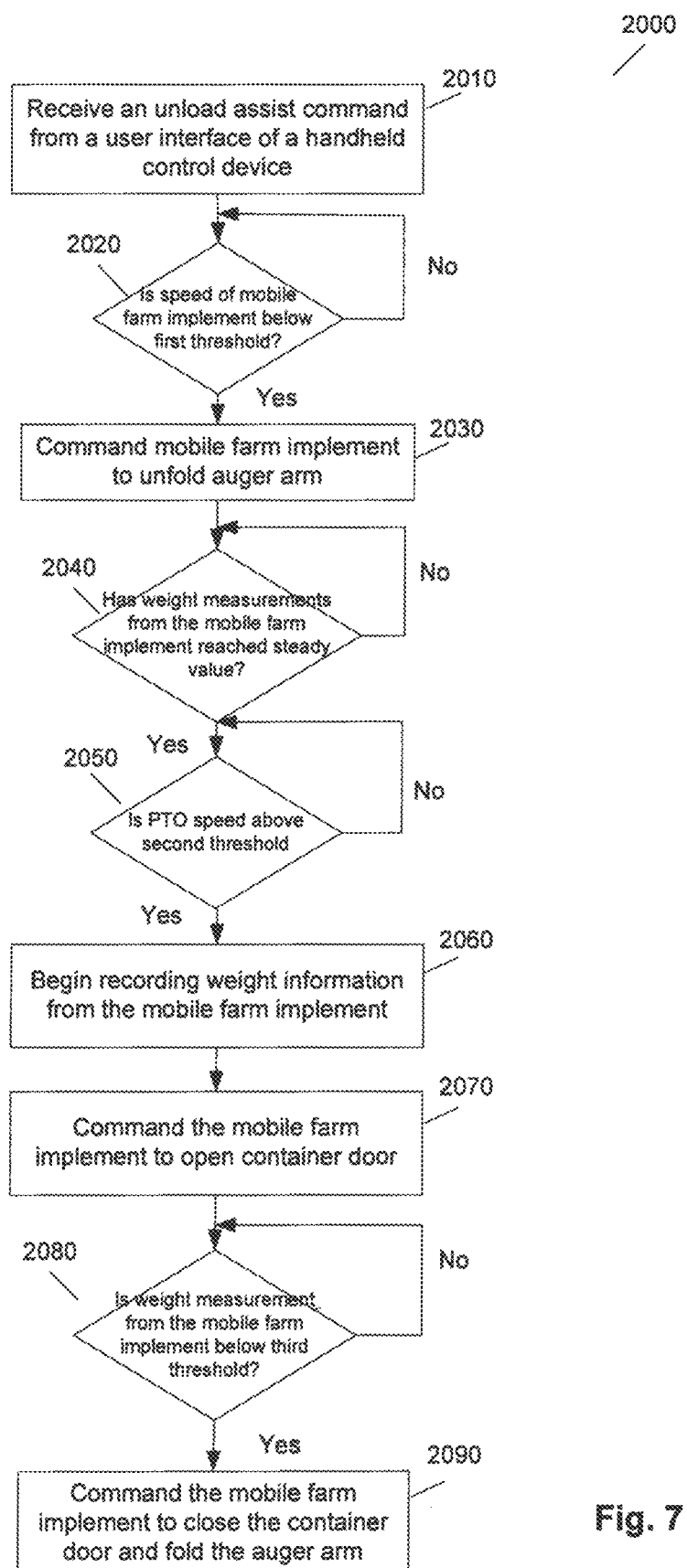
FIG. 7 illustrates a flow chart showing example operations of a method for automating unloading of a mobile farm implement.
Figure 8:
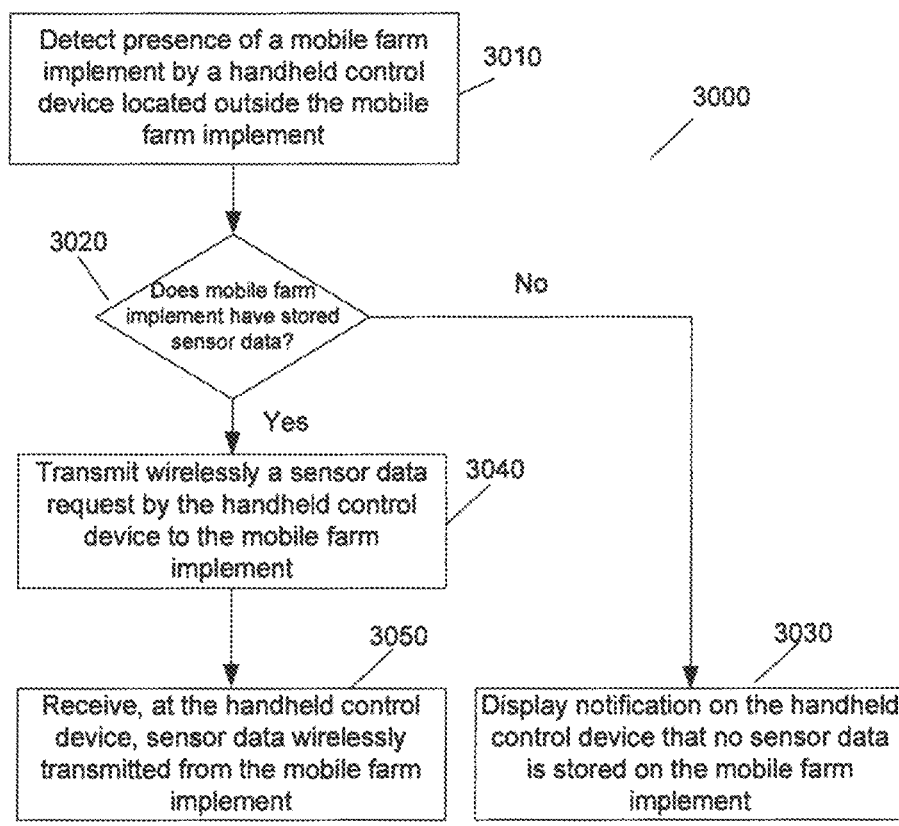
FIG. 8 illustrates a flow chart showing example operations for wirelessly receiving sensor data from a mobile farm implement by a handheld control device that is located outside the mobile farm implement.

FIGS. 6-8 illustrate example methods for interfacing with or controlling mobile farm implements, such controlling the tractor 200 or the grain cart 300 with the control device 100 or any other control device.

In an embodiment, a control device such as the control device 100 may provide the advantage of supporting different mobile farm implements using different communication protocols. For example, one mobile farm implement may use the ISO 11783 (i.e., Isobus) communication protocol, while another mobile farm implement may use the ISO 11898 (i.e., CANbus) communication protocol. The handheld control device may thus consolidate control of multiple mobile farm implements to one control device and reduce cost for operators of multiple mobile farm implements. One example of a method 1000 of using the handheld control device to communicate with multiple mobile implements is illustrated in FIG. 6.

At an operation 1010, presence of a first mobile farm implement may be detected, such as by the communication sub-module 121 on the control device 100 or any other control device. The detection may be automatic, or may receive assistance from a user of the control device. For example, the control device may receive a sensor signal that identifies the presence of the first mobile farm implement, or may receive a user input indicating that the first mobile farm implement is present. In some cases, the received sensor signal may be a response to a polling signal previously sent by the control device to poll for presence of mobile farm implements.

At an operation 1020, a determination may be made that the first mobile farm implement uses a first communication protocol. In an embodiment, the determination may be based on the first mobile implement's model, manufacturer, or category (e.g., whether it is a tractor, grain cart, harvester, etc.). In an embodiment, the determination may be based on a signal from the first mobile implement that identifies the communication protocol it is using. The determination may be automatic, or may be assisted by user input.

At an operation 1025, a determination may be made on whether a description of the first communication protocol is stored on the control device. In an embodiment, the description may detail, for example, how a command to the first mobile farm implement may be formatted or transmitted, or how information from the first mobile farm implement may be interpreted. The description may be stored on, for example, the storage device 106 or the memory 107 of the handheld control device 100.

At an operation 1030, the description for the first communication protocol may be retrieved from a server in response to a determination that the description of the first communication protocol is not stored on the control device. In an embodiment, the server may be remote from the control device. For example, the control device may retrieve the description from a server over a wireless phone network such as a cellular network.

At an operation 1040, if the description of the first communication protocol is stored on the control device or is retrieved from the server, communication of command or sensor information may be made with the first mobile implement using the first communication protocol. As an example, the control device may format the command to comply with the first communication protocol, and may use the protocol to interpret signals (e.g., signals carrying sensor information) received from the first mobile farm implement.

At an operation 1050, presence of a second mobile farm implement may be detected by the control device. The detection may be performed at a same time as the detection at operation 1010, or may be performed at a different time. For example, the first mobile farm implement and second mobile farm implement may interact with the control device simultaneously, or the control device may interact with one mobile farm implement after it has finished interacting with another mobile farm implement. Like in operation 1010, the detection may be performed by the control device 100 or any other control device, and may be done automatically or with assistance from a user.

At an operation 1060, a determination may be made that the second mobile farm implement uses a second communication protocol. The first communication protocol may be different than the second communication protocol. For instance, the two communication protocols may format communicated information differently, or may otherwise specify different ways to encode the communicated information for transmission.

At an operation 1065, a determination may be made on whether a description of the second communication protocol is stored on the control device. In an embodiment, the description may be stored on the storage device 106 or in the memory 107 of the control device 100, like at operation 1025. In response to a determination that the description of the second communication protocol is not stored on the control device, the description may be retrieved from a server, such as the server at operation 1030, or any other server Like in operation 1030, the server may be remote from the control device, and may be accessed over a wireless phone network.

At an operation 1080, if the description of the second communication protocol is stored on the control device or is retrieved from the server, command or sensor information may be communicated with the second mobile farm implement using the second communication protocol. As an example, the control device may format commands to the second mobile communication based on the second communication protocol and may transmit the formatted command using a timing specified by the second communication protocol. The control device may decode signals, such as signals carrying sensor data or other information, using the second communication protocol.

In an embodiment, a control device such as the control device 100 may automate at least a portion of tasks performed by mobile farm implements. FIG. 7 illustrates example operations of a method 2000 of automating at least part of the unloading of agricultural material from a mobile farm implement, such as the unloading of a grain cart. In an embodiment, the unloading may involve unfolding an auger of the mobile farm implement after it has slowed to a certain speed, then opening a container door after a power takeoff actuating the auger has reached a sufficient speed, and monitoring a weight of the mobile farm implement to determine when to stop the unloading. The control device may thus automatically invoke these operations in a desired order and under desired conditions. The automation may free a user from having to manually initiate each operation in the unloading sequence and from having to manually monitor whether a desired condition for each operation is being satisfied.

At an operation 2010, an unload assist command may be received from a user interface of a handheld control device, such as control device 100. In an embodiment, the user interface may include a touch screen, and the unload assist command may be invoked through a button on the touch screen. In an embodiment, operations invoked by the unload assist command may be determined by the automation sub-module 128.

At an operation 2020, a determination may be made as to whether a speed of the mobile farm implement is below a first threshold. For example, the control device 100 may receive sensor information from the grain cart speed sensor 316 to determine whether the grain cart 300 is at or below a certain number of miles per hour. If the speed of the mobile farm implement has not slowed to the first threshold, the speed may continue to be monitored continuously or at discrete intervals.

At an operation 2030, the mobile farm implement may be commanded to unfold its auger arm in response to the determination that the speed of the mobile farm implement is below the first threshold. For instance, after the control device 100 determines that the grain cart 300 is at or below the threshold number of miles per hour, it may transmit an auger unfold command to the tractor interface converter box 210 or to the grain cart interface 330. The interface converter box 210 or the grain cart interface 330 may then cause the auger arm controller 322 to output signals that cause an unfolding movement of the auger 303.

At an operation 2040, a determination may be made as to whether weight measurements from the mobile farm implement has reached a steady value. The weight measurements may be used to determine how much agricultural material is left in the mobile farm implement during the unloading. Before the agricultural material is unloaded, however, the measurements may fluctuate because the mobile farm implement is moving. For instance, movement over an uneven surface may create acceleration or deceleration that changes a weight measured by a weight sensor. In an embodiment, the weight measurement values may reach a steady value when the speed of the mobile farm implement slows to the first threshold. In an embodiment, the measurements may be determined to be steady if they fluctuate within a predetermined range. As an example, the control device 100 may determine whether weight information from the load cell sensor 310 fluctuates at most within a predetermined range.

At an operation 2050, a determination may be made as to whether a power takeoff speed is above a second threshold. The power takeoff may be actuating the auger, which transfers agricultural material during the unloading. After the power takeoff engages the auger, the power takeoff may need to reach a threshold number of rotations per minute before it can be loaded with the agricultural material. As an example, the control device 100 may receive sensor information from the power takeoff sensor 313 and use that information to determine whether a rotational speed of the power takeoff 212 and the auger 303 has reached a second threshold. If the weight measurement at operation 2020 has not reached a steady value or the PTO speed at operation 2050 has not reached the second threshold, they may continue to be monitored continuously or at discrete intervals.

At an operation 2060, weight information from the mobile farm implement may begin to be recorded from the mobile farm implement in response to the determination that the weight measurements have reached a steady value and that the PTO speed has reached the second threshold. The weight information may be recorded to monitor the unloading process as agricultural material is transferred out of the mobile farm implement. For instance, the control device 100 may begin to record, at the storage device 106 or the memory 107, weight information from the load cell sensor 310.

At an operation 2070, the mobile farm implement may be commanded to open a container door in response to the determination that the weight measurements have reached a steady value and that the PTO speed is above the second threshold. In an embodiment, the container door may be separating the auger from the agricultural material being held in the container. Once the auger and power takeoff has reached a sufficient speed to be loaded, the container door may be opened so that the agricultural material can be transferred by the auger to another storage location (e.g., to a truck).

At an operation 2080, a determination may be made as to whether the measured weight of the mobile farm implement is below a third threshold. In an embodiment, the third threshold may correspond to a weight of the mobile farm implement when it is empty of agricultural material. In an embodiment, the third threshold may correspond to a user-specified weight. For instance, the user may wish to unload only a limited amount of agricultural material from the mobile farm implement. As an example, the control device 100 may determine whether a measured weight indicated by the load cell sensor 310 has reached or fallen below a third threshold.

At an operation 2090, the mobile farm implement may be commanded to terminate the unloading process. In an embodiment, the termination command may include a command to close the container door and fold the auger arm. For example, the control device 100 may transmit commands to the interface converter box 210 or the grain cart interface 330, which may in turn cause the container door controller 320 and the auger arm controller 322 to close the container door and fold the auger arm, respectively. In an embodiment, recording of weight measurements from the mobile farm implement may be stopped as part of the termination of the unloading process.

In an embodiment, the commands and monitored conditions may be executed or monitored in the order that is illustrated. In an embodiment, they may be executed or monitored in a different order. In an embodiment, automation of the unloading of the mobile farm implement may involve additional, fewer, or different commands or conditions to be monitored.

In an embodiment, a command or monitored condition may be specified by a user. In an embodiment, an order in which commands are to be executed by the mobile farm implement may be specified by the user. For instance, the control device may display a menu showing a plurality of commands that may be executed during an unloading sequence and a plurality of conditions that may be monitored during the unloading sequence. The user may be allowed to select which commands are to be executed, which conditions are to be monitored, and an order in which the commands are to be executed and in which the conditions are to be monitored. In an embodiment, the user may specify parameters for the commands or thresholds for the monitored conditions.

In an embodiment, a control device such as the control device 100 may allow a user located outside of a mobile farm implement to wirelessly collect information, such as sensor data, from the mobile farm implement. For example, a driver of a harvester may use the control device to wirelessly collect sensor data from the grain cart or any other mobile farm implement. In an embodiment, the driver may perform this data collection while sitting in the harvester, and does not need to walk up to the grain cart or to a tractor towing the grain cart. FIG. 8 illustrates example operations of a method 3000 of wireless data collection.

At an operation 3010, presence of a mobile farm implement may be detected by a handheld control device located outside the mobile farm implement. For example, the handheld control device 100 may detect a mobile farm implement (e.g., grain cart) while the control device 100 is being used by a user in another mobile farm implement (e.g., harvester). The presence may be automatic, or may be assisted by user input.

At an operation 3020, a determination may be made as to whether the mobile farm implement has stored sensor data. In an embodiment, a query may be transmitted to the mobile farm implement to ask whether it has stored sensor data. In an embodiment, the determination may be based on a category, model, or manufacturer of the mobile farm implement. The category, model, or manufacturer may also be determined through a query to the mobile farm implement.

At an operation 3030, if the mobile farm implement is determined to not have stored data, a notification that there is no stored data may be displayed on the handheld control device. If the mobile farm implement is determined to have stored data, a sensor data request may be wirelessly transmitted by the handheld control device to the mobile farm implement at an operation 3040. In an embodiment, the command may request all sensor data stored on the mobile farm implement. In an embodiment, the command may specify what sensor data is being requested.

At an operation 3050, sensor data may wirelessly received by the handheld control device from the mobile farm implement. In an embodiment, the wireless communication may be based on a preexisting protocol such as IEEE 802.11, IEEE 802.16, Bluetooth®, or any other wireless communication protocol.

From the above it will be appreciated that the handheld control device of the present invention may automate at least part of an unloading process of a mobile farm implement, interact with multiple farm implements using multiple communication protocols, or wirelessly collect data from a mobile farm implement. It will also be appreciated that various changes can be made to the system without departing from the spirit and scope of the appended claims. For example, in an embodiment, a handheld control device is not limited to an iPad® or iPhone®, but may include an Android® mobile device, a Windows® mobile device, or any other handheld device. In an embodiment, the control device may have no auxiliary input device, and rely on only a touch screen for input. In an embodiment, the handheld control device may be configured to convert sensor information from a mobile farm implement into a spreadsheet format. In an embodiment, the handheld control device may be configured to communicate sensor information or other information via e-mail or SMS messaging. In an embodiment, the handheld control device may be configured to select from among multiple languages in which to present information on its user interface. In an embodiment, the handheld control device may be configured to convert values for sensor information between metric units and non-metric units.

In an embodiment, the mobile farm implements of this application are not limited to tractors or grain carts, but may include a harvester, combine, or any other mobile farm implement.

In an embodiment, the grain cart interface in the grain cart may lack a processor.

In an embodiment, sensors in the mobile farm implements may include an ultrasonic sensor, a camera, a hitch weight sensor, a tongue weight sensor, or any other sensor.

In an embodiment, a mobile farm implement may have an interface configured to interface with a physical joystick and to execute commands based on signals from the joystick.

In an embodiment, any spout of a mobile farm implement may be controlled via proportional control or discrete control. Proportional control may move the spout based on a value of a command signal, whereas discrete control may move the spout based on a pulse width of the command signal.

It will also be appreciated that the above example components and operations are illustrative only, and that an embodiment of the present application may have fewer or more components or operations than those illustrated above, and have operations arranged in an order different than that illustrated above.

The invention claimed is:

1. A controller for automating unloading of a mobile farm implement, wherein the mobile farm implement comprises a container and an auger arm in communication with the container, and the container includes a container door, the controller comprising:

a processor; and a memory coupled to the processor, wherein the controller is coupled to the mobile farm implement, and the controller is configured to:

receive a first command to assist the unloading of agricultural material from the container to the auger arm through the container door;

determine that weight measurements from the mobile farm implement have reached a steady value;

open the container door of the mobile farm implement, in response to determining that the weight measurements have reached the steady value;

determine that a subsequent weight measurement from the mobile farm implement is below a first threshold; and close the container door of the mobile farm implement, in response to determining that the subsequent weight measurement is below the first threshold.

2. The mobile farm implement of claim 1, wherein the controller is further configured to receive a user selection before the first command to assist the unloading of the mobile farm implement is received.

3. The controller of claim 2, wherein the controller is further configured to receive user input specifying the first threshold before the first command to assist the unloading of the mobile farm implement is received.

4. The controller of claim 1, wherein the controller is further configured to engage an auger of the auger arm with a power takeoff.

5. The mobile farm implement of claim 1, wherein the controller is further configured to record subsequent weight measurements from the mobile farm implement in response to the determination that the weight measurements from the mobile farm implement has reached the steady value.

* * * * *